(12) United States Patent
Oie

(10) Patent No.: US 12,525,395 B2
(45) Date of Patent: Jan. 13, 2026

(54) ELECTRONIC COMPONENT

(71) Applicant: Murata Manufacturing Co., Ltd., Kyoto (JP)

(72) Inventor: Hirofumi Oie, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 131 days.

(21) Appl. No.: 18/412,835

(22) Filed: Jan. 15, 2024

(65) Prior Publication Data

US 2024/0153703 A1 May 9, 2024

Related U.S. Application Data

(63) Continuation of application No. PCT/JP2022/027011, filed on Jul. 7, 2022.

(30) Foreign Application Priority Data

Jul. 19, 2021 (JP) ................. 2021-119027

(51) Int. Cl.
*H01G 2/24* (2006.01)
*H01G 4/00* (2006.01)
*H01G 4/005* (2006.01)

(52) U.S. Cl.
CPC .............. *H01G 2/24* (2013.01); *H01G 4/005* (2013.01)

(58) Field of Classification Search
None
See application file for complete search history.

(56) References Cited

U.S. PATENT DOCUMENTS

| 12,014,861 | B2 * | 6/2024 | Maki | H01F 41/041 |
| 2014/0299016 | A1 * | 10/2014 | Tabata | H01G 2/24 |
| | | | | 106/31.95 |
| 2017/0352467 | A1 * | 12/2017 | Kakiuchi | H01F 17/0013 |
| 2018/0061551 | A1 * | 3/2018 | Kondou | H01F 27/323 |
| 2024/0153703 | A1 * | 5/2024 | Oie | H01G 4/33 |
| 2024/0194404 | A1 * | 6/2024 | Oie | H01G 2/24 |
| 2024/0249861 | A1 * | 7/2024 | Oie | H01C 1/04 |

(Continued)

FOREIGN PATENT DOCUMENTS

| JP | S61-101014 A | | 5/1986 |
| JP | 2004031833 A | * | 1/2004 |
| JP | 2007242806 A | * | 9/2007 |

(Continued)

OTHER PUBLICATIONS

International Search Report for PCT/JP2022/027011 dated Oct. 11, 2022.

*Primary Examiner* — Dion R. Ferguson
(74) *Attorney, Agent, or Firm* — McDonald Hopkins LLC

(57) ABSTRACT

To provide an electronic component capable of achieving both adhesion and visibility of a mark to an element body. An electronic component includes an element body and a mark formed on the element body. A main material of the mark is different from a material of the element body. The mark includes a first portion that constitutes a part of the mark and a second portion located at a position different from the first portion and connected to the first portion. A ratio of a main material of the mark included in the first portion is lower than a ratio of a main material of the mark included in the second portion.

14 Claims, 12 Drawing Sheets

(56) References Cited

U.S. PATENT DOCUMENTS

2024/0282519 A1* 8/2024 Goitsuka .................. H01G 2/24
2024/0321516 A1* 9/2024 Goitsuka .................. H01C 1/04

FOREIGN PATENT DOCUMENTS

| JP | 2014-201484 A | 10/2014 |
| JP | 2017-216409 A | 12/2017 |
| JP | 2018-037516 A | 3/2018 |
| JP | 2019-067953 A | 4/2019 |

* cited by examiner

ELECTRONIC COMPONENT

CROSS REFERENCE TO RELATED APPLICATION

This is a continuation of International Application No. PCT/JP2022/027011 filed on Jul. 7, 2022 which claims priority from Japanese Patent Application No. 2021-119027 filed on Jul. 19, 2021. The contents of these applications are incorporated herein by reference in their entireties.

BACKGROUND OF THE DISCLOSURE

Field of the Disclosure

The present disclosure relates to an electronic component including an element body and a mark formed on the element body, and a method of manufacturing the electronic component.

Description of the Related Art

As an example of an electronic component including an element body and a mark formed on the element body, Patent Document 1 discloses a passive electronic component including a marker portion indicating an attitude and a direction of the component.

In the passive electronic component disclosed in Patent Document 1, the marker portion corresponding to the mark is disposed in a recess formed in an insulator portion corresponding to the element body. The material of the marker portion is selected according to the material of the insulator portion. For example, in a case where the insulator portion is made of a filler such as a magnetic material and a resin, a resin can be used for the marker portion.

Patent Document 1: JP-A-2018-37516

BRIEF SUMMARY OF THE DISCLOSURE

The mark needs to have a color different from that of the element body in order to improve visibility. Therefore, the mark can be formed of a material different from the element body. However, in this case, the adhesion of the mark to the element body may be lowered. In a case where the mark is formed outside the element body, the mark may be peeled off from the element body. In a case where the mark is formed inside the element body, when peeling of the mark from the element body occurs, a force due to the peeling of the mark may act on the element body to spread a crack in the element body.

In order to enhance the adhesion of the mark to the element body, it is known to mix the same material as the element body with the mark. For example, in the passive electronic component disclosed in Patent Document 1, a resin that is a material of the marker portion corresponding to the mark is included in the insulator portion corresponding to the element body. However, in this case, the color of the mark and the color of the element body become close to each other. Therefore, the visibility of the mark with respect to the element body may be lowered.

Therefore, a possible benefit of the present disclosure is to solve the above problems, and to provide an electronic component capable of achieving both adhesion and visibility of a mark to an element body.

In order to achieve the above possible benefit, the present disclosure is configured as follows. An element body; and a mark formed on the element body, in which the mark includes: a first portion that constitutes a part of the mark when viewed from an orthogonal direction orthogonal to the mark; and a second portion located at a position different from the first portion and connected to the first portion when viewed from the orthogonal direction, and a ratio of a main material of the mark included in the first portion is lower than a ratio of a main material of the mark included in the second portion.

According to the present disclosure, it is possible to achieve both adhesion and visibility of a mark to an element body.

DETAILED DESCRIPTION OF THE DISCLOSURE

Figure 1:
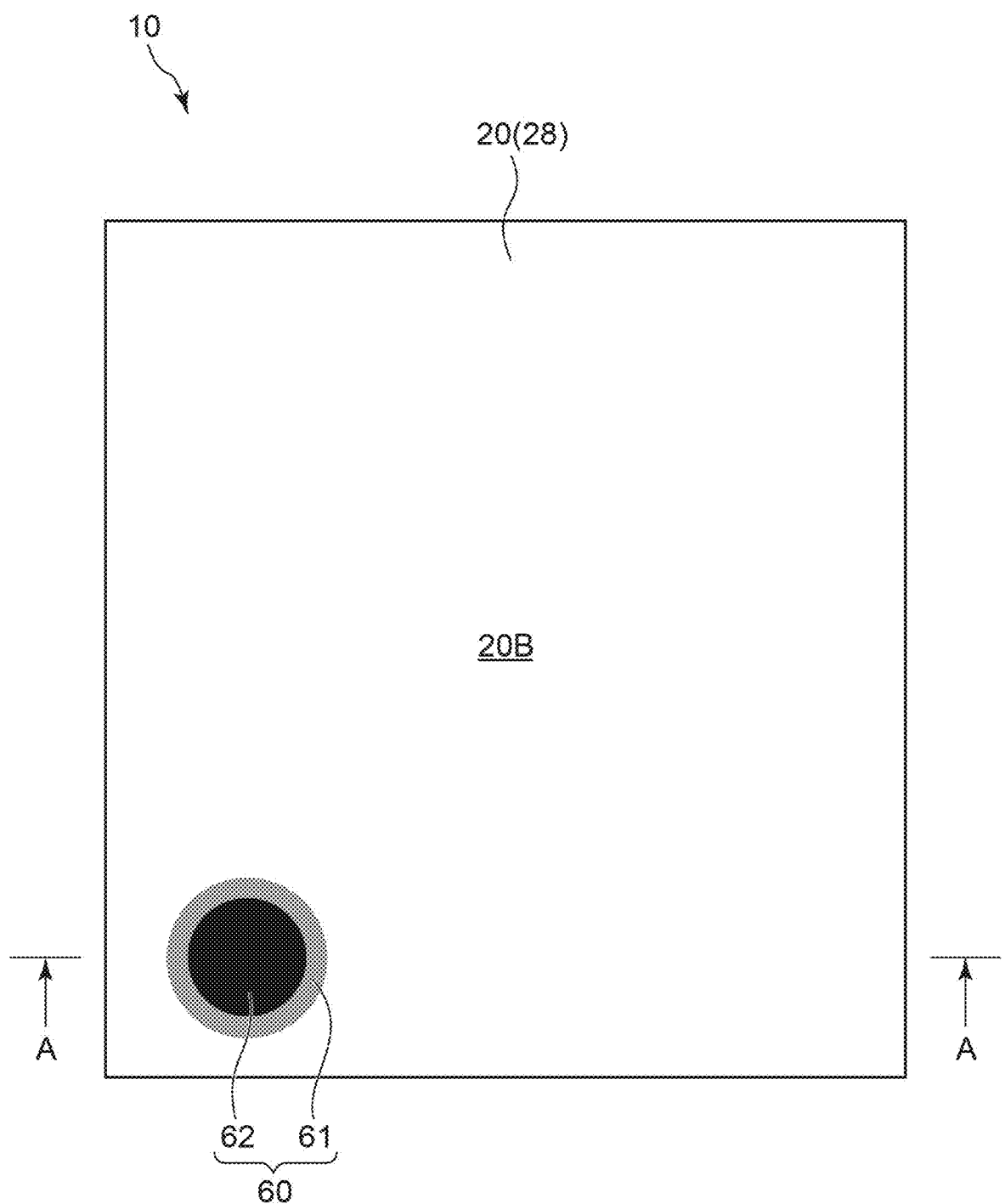
FIG. 1 is a plan view of an electronic component according to a first embodiment of the present disclosure.

An electronic component according to an aspect of the present disclosure includes: an element body; and a mark formed on the element body, in which the mark includes: a first portion that constitutes a part of the mark when viewed from an orthogonal direction orthogonal to the mark; and a second portion located at a position different from the first portion and connected to the first portion when viewed from the orthogonal direction, and a ratio of a main material of the mark included in the first portion is lower than a ratio of a main material of the mark included in the second portion.

According to this configuration, a ratio of a constituent material is different between the first portion and the second portion.

Since the ratio of the constituent material is different between the first portion and the second portion, it is possible to make one of the first portion and the second portion contain a material (for example, the same material as the material of the element body) having high adhesion to the element body more than the other of the first portion and the second portion. As a result, the adhesion of one of the first portion and the second portion of the mark to the element body can be enhanced more than the adhesion of the other of the first portion and the second portion of the mark to the element body.

Furthermore, since the ratio of the constituent material is different between the first portion and the second portion, the visibility of the other of the first portion and the second portion of the mark with respect to the element body can be enhanced more than the visibility of one of the first portion and the second portion of the mark with respect to the element body.

As described above, according to this configuration, both the adhesion of the mark to the element body and the visibility can be achieved.

In the electronic component, a main material of the mark may be different from a material of the element body.

According to this configuration, the ratio of the material other than the main material of the mark included in the first portion is higher than the ratio of the material other than the main material of the mark included in the second portion. That is, the first portion can contain a material having high adhesion to the element body (for example, the same material as the material of the element body) more than the second portion as a material other than the main material of the mark. Accordingly, in the first portion of the mark, adhesion to the element body can be enhanced.

According to this configuration, the main material of the mark is different from the main material of the element body. Therefore, as the ratio of the main material of the mark included in the mark is higher, the visibility of the mark with respect to the element body is improved. Here, according to this configuration, the ratio of the main material of the mark included in the second portion is higher than the ratio of the main material of the mark included in the first portion. Accordingly, in the second portion of the mark, the visibility with respect to the element body can be enhanced.

In the electronic component, the first portion may be an outer edge portion of the mark, and the second portion may be a portion inside the outer edge portion of the mark when viewed from the orthogonal direction.

In a case where the outer edge portion of the mark viewed from the orthogonal direction is peeled off from the element body, the peeling is more likely to spread than a case where an inside of the outer edge portion of the mark viewed from the orthogonal direction is peeled off from the element body. This is because in a case where the inside of the outer edge portion of the mark viewed from the orthogonal direction is peeled off from the element body, the spread of the peeling is suppressed by the outer edge portion of the mark viewed from the orthogonal direction. Therefore, it is particularly required to prevent occurrence of peeling at the outer edge portion of the mark. According to this configuration, the adhesion of the outer edge portion of the mark to the element body as viewed from the orthogonal direction is high. Therefore, the possibility of peeling of the outer edge portion of the mark from the element body can be reduced.

In the electronic component, a length of the first portion in the orthogonal direction may be shorter than a length of the second portion in the orthogonal direction.

According to this configuration, the first portion is shorter than the second portion in the orthogonal direction. In other words, a thickness of the first portion is thinner than a thickness of the second portion. Therefore, a structure penetrating the first portion is more easily formed in the first portion than in the second portion. As a result, the adhesion of the first portion to the element body can be made higher than the adhesion of the second portion to the element body by a so-called anchor effect.

In the electronic component, the mark may include another material different from a main material, and the first portion may include a penetration portion penetrating from one end to the other end in the orthogonal direction and filled with the another material of the mark.

According to this configuration, the another material of the mark fills the penetration portion of the first portion. In a case where the another material of the first portion is a material having high adhesion to the element body, the another material in close contact with the element body penetrates the first portion through the penetration portion. Thereby, the adhesion of the first portion to the element body can be enhanced.

In the electronic component, the mark may include another material different from a main material, and the main material of the mark may be the same material as the element body.

According to this configuration, since the another material of the mark and the main material of the element body are the same material, adhesion between them is high. Therefore, the adhesion of the mark to the element body can be enhanced.

In the electronic component, the main material of the mark may be non-conductive.

In a case where the mark is made of a conductive material, parasitic capacitance may occur between the mark and another electrode or the like formed on the element body. Furthermore, there is a possibility that the mark and the another electrode or the like formed on the element body are short-circuited. According to this configuration, since the main material of the mark is non-conductive, the occurrence of the parasitic capacitance and the short circuit described above can be prevented.

In the electronic component, the mark may be formed on an outer surface of the element body.

According to this configuration, since the mark is exposed to the outside of the element body, the visibility of the mark can be enhanced.

In the electronic component, the mark may be formed inside the element body.

According to this configuration, the mark is formed inside the element body. With the mark this, the adhesion of the mark to the element body can be enhanced.

In the electronic component, the element body may be made of ceramic.

First Embodiment

Figure 2:
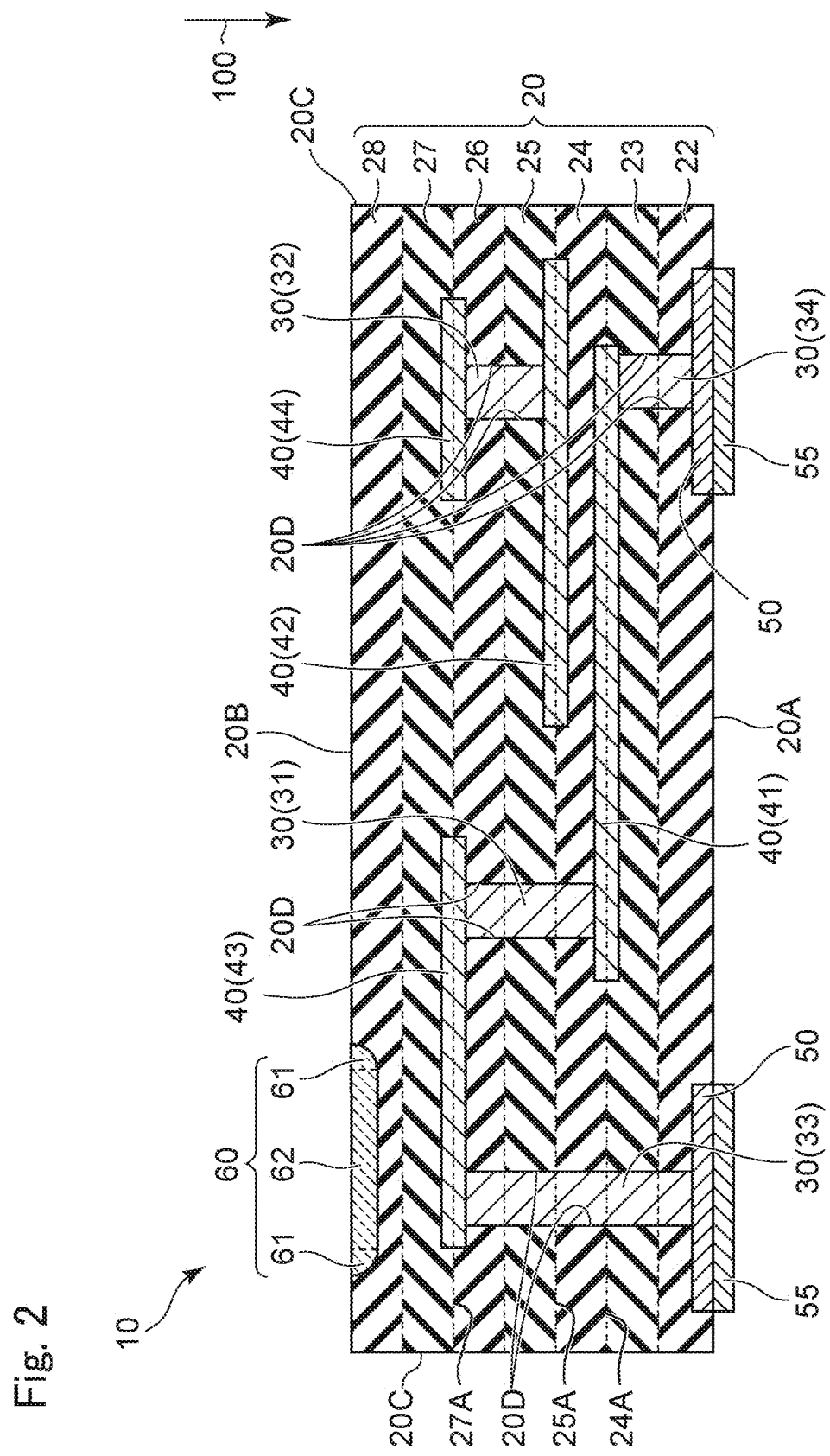
FIG. 2 is a cross-sectional view illustrating a cross section taken along line A-A in FIG. 1.

FIG. 1 is a plan view of an electronic component according to a first embodiment of the present disclosure. FIG. 2 is a cross-sectional view illustrating an A-A cross section of FIG. 1. In the electronic component, a mark is provided on an element body. In the electronic component according to the first embodiment, an internal conductor and an external electrode are provided on the element body in addition to the mark. The electronic component can be mounted on a mother substrate or the like via the external electrode.

As illustrated in FIGS. 1 and 2, an electronic component 10 according to the first embodiment includes an element body 20, an interlayer connection conductor 30, an internal electrode 40, an external electrode 50, a plating layer 55, and an identification mark 60. The identification mark 60 is an example of the mark.

Figure 11:
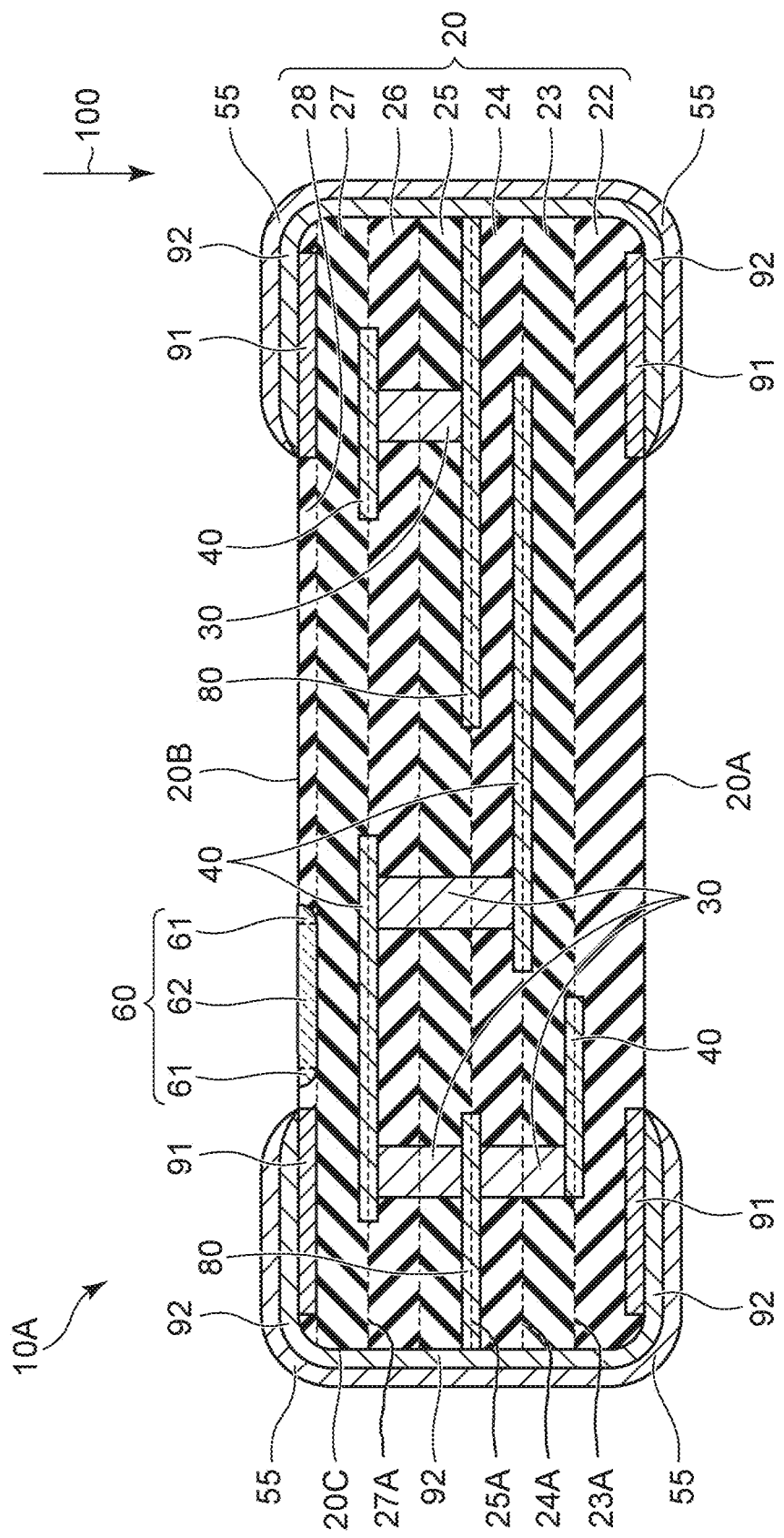
FIG. 11 is a cross-sectional view illustrating a B-B cross section of FIG. 10.
Figure 12:
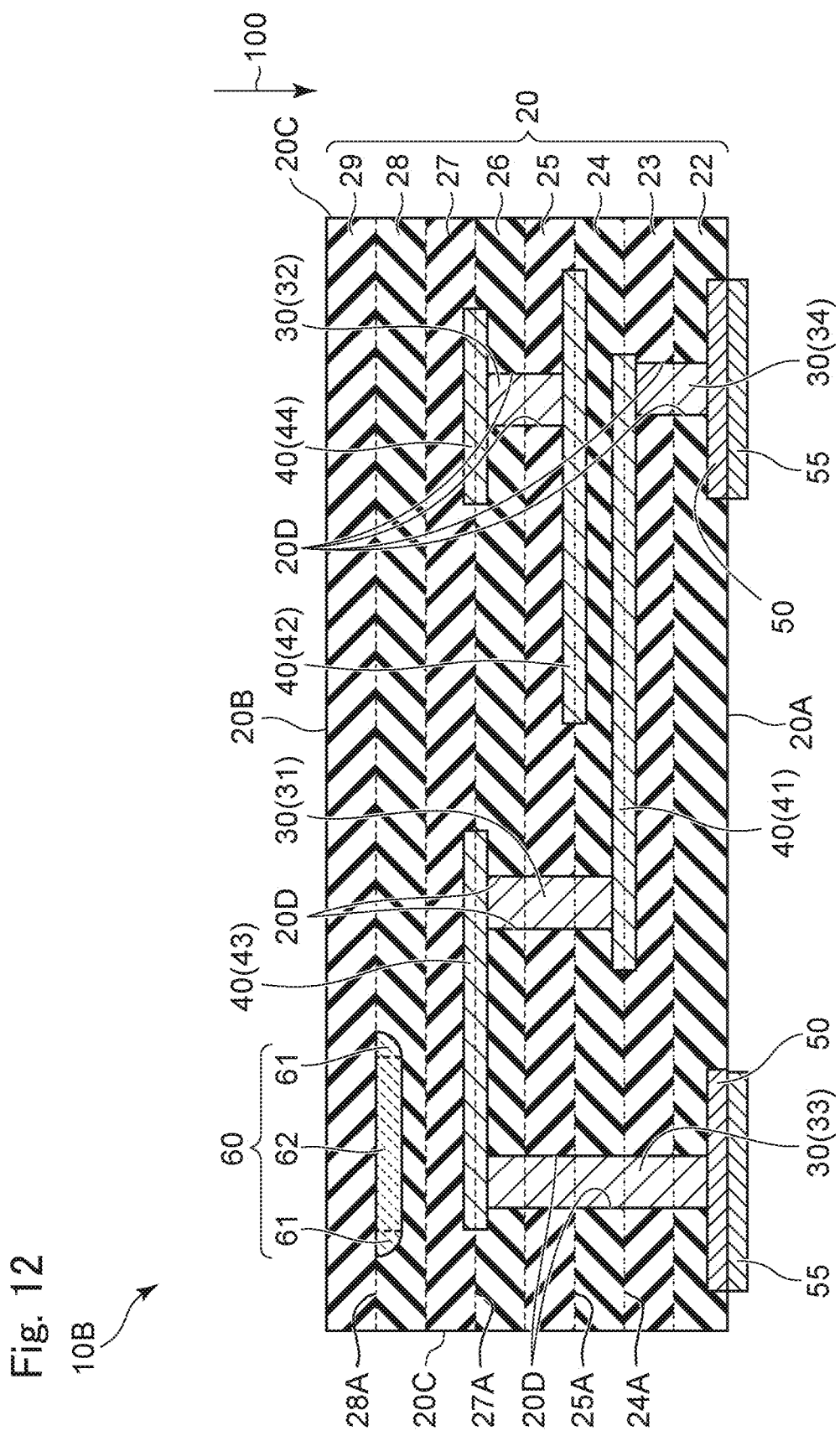
FIG. 12 is a cross-sectional view of an electronic component according to a third embodiment of the present disclosure, corresponding to a cross section taken along line A-A in FIG. 1.

The element body 20 has a rectangular parallelepiped shape as a whole. The shape of the element body 20 is not limited to a rectangular parallelepiped shape. In the first embodiment, the element body 20 is formed by integrating the laminated base materials 22 to 28. The number of base materials constituting the element body 20 is not limited to seven. Each of the base materials 22 to 28 is insulating and has a plate shape. In the first embodiment, the element body 20 (each of the base materials 22 to 28) is made of low temperature co-fired ceramics (LTCC). The element body 20 is not limited to LTCC, and may be made of ceramic other than LTCC such as alumina, or may be made of resin such as glass epoxy, Teflon (registered trademark), or paper phenol. In the case of the first embodiment, since the element body 20 is a sintered body of the same material, there is no interface between the base materials 22 to 28. In FIG. 2 and FIGS. 11 and 12 described later, broken lines are drawn between the base materials 22 to 28 for convenience of description. Note that in a case where the element body 20 is formed by laminating different materials, an interface may remain at a position indicated by the broken line in FIG. 2.

As illustrated in FIG. 2, the element body 20 includes principal surfaces 20A and 20B and a side surface 20C. The principal surface 20A is a principal surface of the base material 22 and faces the outside of the element body 20. The principal surface 20B is a principal surface of the base material 28 and faces the outside of the element body 20. The principal surface 20B faces opposite to the principal surface 20A. The side surface 20C is configured by a side surface of the base materials 22 to 28. The side surface 20C connects the principal surfaces 20A and 20B.

The interlayer connection conductor 30 is formed inside the element body 20. The interlayer connection conductor 30 can be formed on at least one of the base materials 22 to 28. In the first embodiment, the interlayer connection conductor 30 is formed on the base material 22 to 26.

The interlayer connection conductor 30 is formed by filling a through hole 20D extending through at least one of the plurality of base materials 22 to 28 in a thickness direction of the base materials 22 to 28 with a conductive paste and co-firing the paste with a ceramic (LTCC in the first embodiment). The conductive paste contains, for example, a conductive powder such as copper. The conductive powder contained in the conductive paste is not limited to copper, and may be, for example, silver. In a case where the element body 20 is made of resin, the interlayer connection conductor 30 is formed by plating a conductive metal made of copper or the like. In the first embodiment, since the through hole 20D has a cylindrical shape, the interlayer connection conductor 30 has a cylindrical shape. The shape of the through hole 20D is not limited to the cylindrical shape, and may be, for example, a shape such as a quadrangular prism.

In FIG. 2, the interlayer connection conductor 30 includes four interlayer connection conductors 31 to 34. The interlayer connection conductor 31 is filled in the through hole 20D extending through the base materials 24 to 26. The interlayer connection conductor 32 is filled in the through hole 20D extending through the base materials 25 and 26. The interlayer connection conductor 33 is filled in the through hole 20D extending through the base materials 22 to 26. The interlayer connection conductor 34 is filled in the through hole 20D extending through the base materials 22 and 23. The number of the interlayer connection conductors 30 is not limited to four. A length of each of the interlayer connection conductors 31 to 34 (the number of penetrated base materials) in the thickness direction is not limited to the length described above.

The internal electrode 40 is formed inside the element body 20 and is not exposed to the outside of the element body 20. The internal electrode 40 can be formed on at least one of the base materials 22 to 28. In the first embodiment, the internal electrode 40 is formed on a principal surface 24A of the base material 24, a principal surface 25A of the base material 25, and a principal surface 27A of the base material 27.

In a case where the element body 20 is made of ceramic as in the first embodiment, the internal electrode 40 is formed by printing a conductive paste on a principal surface (in the first embodiment, the principal surfaces 24A, 25A, and 27A) of the base material and co-firing the paste with the base material. The conductive paste is made of, for example, copper or silver. In a case where the element body 20 is made of resin, the internal electrode 40 is formed on the principal surface of the base material by a known means such as etching a metal foil.

In FIG. 2, the internal electrode 40 includes four internal electrodes 41 to 44. The internal electrode 41 is formed on the principal surface 24A of the base material 24. The internal electrode 42 is formed on the principal surface 25A of the base material 25. The internal electrodes 43 and 44 are formed on the principal surface 27A of the base material 27.

Each of the internal electrodes 40 is electrically connected to the other internal electrode 40 and the external electrode 50 via the interlayer connection conductor 30. In the first embodiment, the internal electrodes 41 and 43 are electrically connected to each other via the interlayer connection conductor 31. Furthermore, the internal electrodes 42 and 44 are electrically connected to each other via the interlayer connection conductor 32. Furthermore, each of the internal electrodes 41 and 43 is electrically connected to the external electrode 50 described later via the interlayer connection conductors 33 and 34.

The external electrode 50 is formed outside the element body 20. That is, the external electrode 50 is exposed to the outside of the element body 20. In the first embodiment, the external electrode 50 is formed on the principal surface of the base material 22, that is, the principal surface 20A of the element body 20. Note that the external electrode 50 may be formed on the principal surface of the base material 28, that is, the principal surface 20B of the element body 20.

The external electrode 50 is configured in the same manner as the internal electrode 40. That is, in the first embodiment, the external electrode 50 is obtained by printing a conductive paste on the principal surface 20A of the element body 20 and co-firing the paste with the base materials 22 to 28. In the first embodiment, the electronic component 10 includes two external electrodes 50. As described above, each of the external electrodes 50 is electrically connected to each of the internal electrodes 41 and 43.

The plating layer 55 covers the external electrode 50. The plating layer 55 suppresses the influence of atmosphere, moisture, and the like on the external electrode 50. The plating layer 55 is, for example, a film made of Ni—Sn, Ni-electroless Au, or the like. In FIG. 2, two plating layers 55 are drawn, but the number of plating layers 55 included in the electronic component 10 is not limited to two.

The identification mark 60 is formed on the element body 20. The identification mark 60 is for indicating an attitude and a direction of the electronic component 10. In the first embodiment, the identification mark 60 is formed on an outer surface of the element body 20, that is, the principal surface 20B of the element body 20. Note that the identification mark 60 may be formed on another outer surface of the element body 20, for example, the principal surface 20A of the element body. Furthermore, in the first embodiment, the electronic component 10 includes one identification mark 60, but may include a plurality of the identification marks 60.

In the first embodiment, the identification mark 60 enters the element body 20. As a result, an outer surface of the identification mark 60 is flush or substantially flush with the principal surface 20B of the element body 20. Note that the outer surface of the identification mark 60 may not enter the element body 20, and may not be flush or substantially flush with the principal surface 20B of the element body 20. For example, the identification mark 60 may protrude from the principal surface 20B of the element body 20 by only a part thereof entering the element body 20.

The identification mark 60 includes a plurality of types of materials. The plurality of types of materials are a main material and other materials. The main material is a material having the highest ratio among the plurality of types of materials included in the identification mark 60. The other materials are materials different from the main material. Note that in the first embodiment, the other materials are one type as described later, but may be a plurality of types.

In the first embodiment, the materials constituting the identification mark 60 are ceramic (Hereinafter, the ceramic is referred to as an oxide-added ceramic.) to which an oxide such as alumina, zirconia, or cobalt is added, and LTCC. A ratio of the oxide-added ceramic included in the identification mark 60 is higher than a ratio of the LTCC included in the identification mark 60. For example, the ratio of the oxide-added ceramic included in the identification mark 60 is 50% or more. In order to further enhance the visibility, the ratio is desirably 60% or more. The oxide-added ceramic is a non-conductive inorganic material. The oxide-added ceramic is an example of the main material of the identification mark. The LTCC is an example of the other materials of the identification mark. Note that the visibility of the identification mark 60 may be improved by making the oxide-added ceramic different in color from the element body 20.

In the first embodiment, the main material of the identification mark 60 is different from the material of the element body 20. On the other hand, the other material of the identification mark 60 is the same material as the material of the element body 20. In the first embodiment, the material of the element body 20 is LTCC as described above. That is, the main material (oxide-added ceramic) of the identification mark 60 is different from the material (LTCC) of the element body 20, and the other material (LTCC) of the identification mark 60 is the same material as the material (LTCC) of the element body 20. Note that the main material of the identification mark 60 may be the same as the material of the element body 20. Furthermore, other materials of the identification mark 60 may be different from the material of the element body 20.

The main material of the identification mark 60 is not limited to the oxide-added ceramic. For example, the main material of the identification mark 60 may be resin or the like which is a material different from ceramic. In a case where the main material of the identification mark 60 is a resin, the resin may be formed of Teflon (registered trademark), polyimide, epoxy, phenol, or the like. Furthermore, for example, the main material of the identification mark 60 may be metal such as copper or silver. That is, the main material of the identification mark 60 may be conductive. Furthermore, for example, the main material of the identification mark 60 may be ceramic as described above.

In the first embodiment, the other material of the identification mark 60 is LTCC, but may be a material other than LTCC. That is, the other material of the identification mark 60 may be a material different from the material of the element body 20 as described above. In this case, the other material of the identification mark 60 preferably has a property close to that of the material of the element body 20. For example, in a case where the material of the element body 20 is LTCC which is ceramic, the other material of the identification mark 60 is preferably ceramic (The other material may be LTCC or a ceramic other than LTCC.) rather than a material other than ceramic such as metal or resin.

In the first embodiment, the element body 20 is made of one type of material (LTCC), but the element body 20 may be made of a plurality of types of materials. In this case, the "material of the element body" refers to a material having the highest ratio among the plurality of types of materials included in the element body, that is, a main material of the element body.

As illustrated in FIG. 2, the identification mark 60 includes a first portion 61 and a second portion 62.

Figure 3:
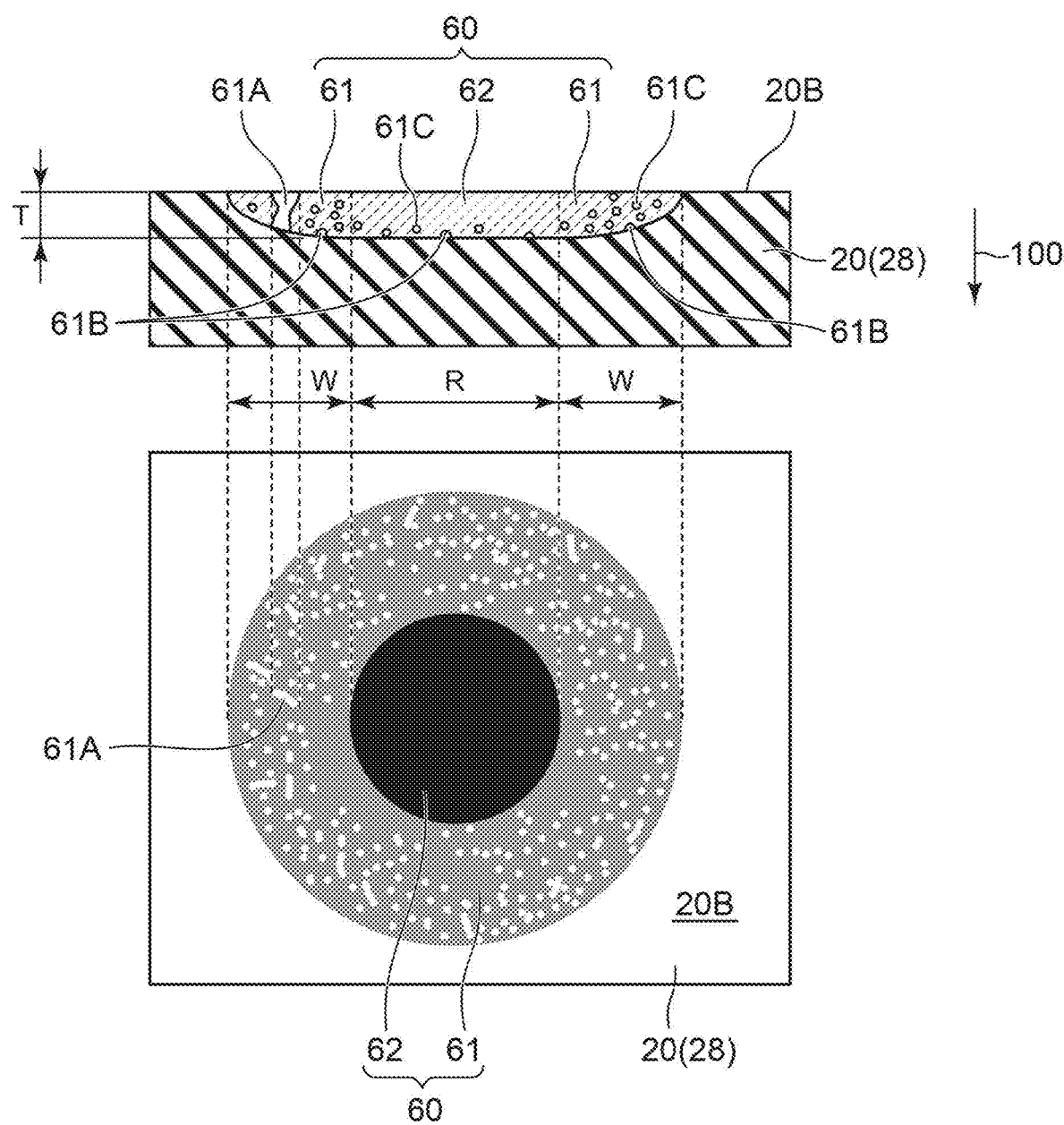
FIG. 3 is a plan view and a cross-sectional view illustrating a mark of the electronic component according to the first embodiment of the present disclosure and its periphery.

FIG. 3 is a plan view and a cross-sectional view illustrating the identification mark of the electronic component according to the first embodiment of the present disclosure and its periphery. A lower drawing of FIG. 3 is a plan view, and an upper drawing of FIG. 3 is a cross-sectional view. Note that the plan view is a view of the electronic component 10 as viewed in the orthogonal direction 100 (see FIG. 2). The orthogonal direction 100 is a direction orthogonal to the principal surface 20B of the element body 20. In other words, the orthogonal direction 100 is a direction orthogonal to the identification mark 60.

As illustrated in the plan view of FIG. 3, the first portion 61 is an outer edge portion of the identification mark 60 when viewed from the orthogonal direction 100. That is, when viewed in the orthogonal direction 100, the first portion 61 constitutes a part of the identification mark 60. When viewed in the orthogonal direction 100, the second portion 62 is a portion inside the outer edge portion of the identification mark 60. The first portion 61 and the second portion 62 are connected to each other. The first portion 61 surrounds the entire circumference of the second portion 62.

In the first embodiment, as illustrated in FIG. 3, the identification mark 60 is circular when viewed from the orthogonal direction 100, and the first portion 61 surrounds the second portion 62. However, the shape of the identification mark 60 may be, for example, a quadrangle other than a circle. Furthermore, a positional relationship between the first portion 61 and the second portion 62 is not limited to the above-described positional relationship on condition that the first portion 61 and the second portion 62 are at different positions and connected to each other. For example, contrary to the above, the second portion 62 may surround the first portion 61. Furthermore, for example, both the first portion 61 and the second portion 62 may be quadrangular, and the quadrangular first portion 61 and the quadrangular second portion 62 may be arranged side by side.

In the first embodiment, a width W of the first portion 61 is 5 to 10 (μm), and a diameter R of the second portion 62 is 200 to 300 (μm), but the width and the diameter are not limited to the above dimensions. Note that in each drawing, the size of the first portion 61 with respect to the second portion 62 is illustrated to be larger than the actual size.

As illustrated in the cross-sectional view of FIG. 3, a length of the second portion 62 in the orthogonal direction 100 is a thickness T. On the other hand, a length of the first portion 61 in the orthogonal direction 100 decreases from a boundary portion with the second portion 62 toward the outside of the identification mark 60. That is, the length of the first portion 61 in the orthogonal direction 100 is shorter than the thickness T of the second portion 62. In the first embodiment, the thickness T is 10 (μm), but is not limited to 10 (μm).

Figure 4:
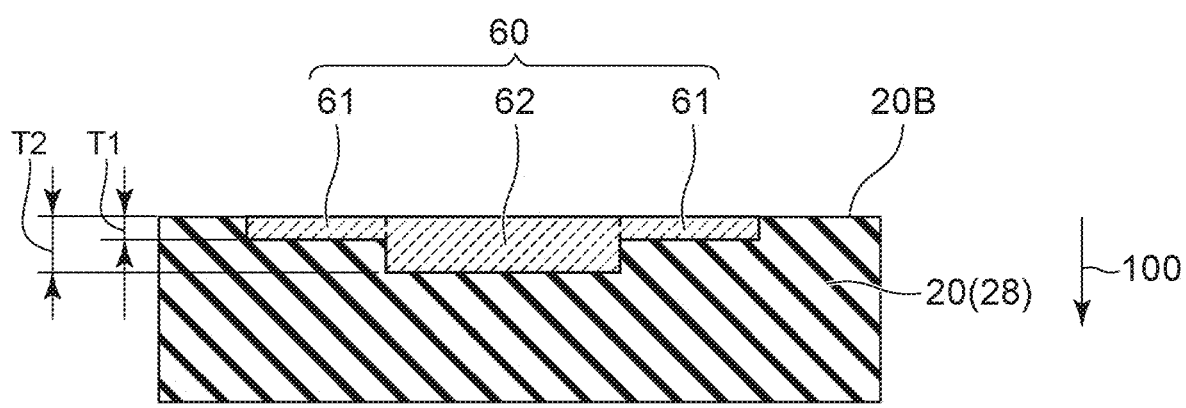
FIG. 4 is a cross-sectional view illustrating a mark of an electronic component according to a modification of the first embodiment of the present disclosure and its periphery.

Note that in FIG. 3, the length of the first portion 61 in the orthogonal direction 100 decreases from the boundary with the second portion 62 toward the outside of the identification mark 60, but it is not limited to such a configuration. FIG. 4 is a cross-sectional view illustrating an identification mark of an electronic component according to a modification of the first embodiment of the present disclosure and its periphery. For example, as illustrated in FIG. 4, a boundary portion between the first portion 61 and the second portion 62 may have a stepwise shape. In this case, a thickness T1, which is the length of the first portion 61 in the orthogonal direction 100, is shorter than a thickness T2, which is the length of the second portion 62 in the orthogonal direction 100.

Furthermore, in FIGS. 3 and 4, the length of the first portion 61 in the orthogonal direction 100 is shorter than the length of the second portion 62 in the orthogonal direction 100, but the length of the first portion 61 in the orthogonal direction 100 may be the length or more of the second portion 62 in the orthogonal direction 100.

In FIG. 3, another material (LTCC) included in the identification mark 60 is represented in a shape such as a circle. As illustrated in FIG. 3, a ratio of the another material (LTCC) of the identification mark 60 included in the first portion 61 is higher than a ratio of LTCC included in the second portion 62. In other words, a ratio of the main material (oxide-added ceramic) of the identification mark 60 included in the first portion 61 is lower than a ratio of the oxide-added ceramic included in the second portion 62. In the first embodiment, a volume is used to calculate the ratio. The ratio of the LTCC contained in the first portion 61 is calculated by dividing a volume of the LTCC contained in the first portion 61 by a volume of the entire first portion 61. Note that, for example, weight may be used in addition to the volume for calculation of the ratio.

Note that the shape, size, and number of the another material are not limited to the shape, size, and number illustrated in FIG. 3. For example, in FIG. 3, most of the another material (LTCC) included in the identification mark 60 are illustrated as circles having the same size, but the sizes of the circles are various.

As illustrated in the cross-sectional view of FIG. 3, the first portion 61 of the identification mark 60 includes a penetration portion 61A. The penetration portion 61A is a portion where the another material (LTCC) included in the identification mark 60 penetrates the first portion 61 in the orthogonal direction 100. That is, in the penetration portion 61A, a through hole extending through the first portion 61 from one end portion to the other end portion of the first portion 61 in the orthogonal direction 100 is filled with the another material (LTCC) included in the identification mark 60.

For example, the penetration portion 61A is formed by the material of the base material 28 entering a blurred portion of a partial region of the identification mark 60 that may occur in the process of printing the identification mark 60 on the base material 28. Furthermore, for example, the penetration portion 61A is formed by the another material penetrating the main material in the identification mark 60 by increasing the ratio of the another material included in the identification mark 60.

Note that, although only one penetration portion 61A is illustrated in the cross-sectional view of FIG. 3, the number of penetration portions 61A is not limited to one. Of course, the shape, size, and number of the penetration portions 61A are not limited to the shape, size, and number illustrated in FIG. 3.

There are three types of the another material (LTCC) included in the identification mark 60. The first type is the penetration portion 61A described above. The second type is a continuous portion 61B. The continuous portion 61B is connected to the element body 20 and is continuous with the element body 20. The third type is a discontinuous portion 61C. The discontinuous portion 61C is not connected to the element body 20. Note that similarly to the continuous portion 61B, the penetration portion 61A is connected to the element body 20 and is continuous to the element body 20. Since the penetration portion 61A and the continuous portion 61B are present at the interface with the element body 20, the adhesion between the identification mark 60 and the element body 20 is enhanced.

Note that in the first embodiment, the first portion 61 and the second portion 62 are made of the same material (the main material (oxide-added ceramic) and the another material (LTCC)), but may be made of different materials.

According to the first embodiment, a ratio of the constituent material is different between the first portion 61 and the second portion 62.

Since the ratio of the constituent material is different between the first portion 61 and the second portion 62, one of the first portion 61 and the second portion 62 can contain a material (for example, the same material as the material of the element body) having high adhesion to the element body 20 more than the other of the first portion 61 and the second portion 62. As a result, adhesion of one of the first portion 61 and the second portion 62 of the identification mark 60 to the element body 20 can be enhanced more than adhesion of the other of the first portion 61 and the second portion 62 of the identification mark 60 to the element body 20.

Furthermore, since the ratio of the constituent material is different between the first portion 61 and the second portion 62, the visibility of the other of the first portion 61 and the second portion 62 of the identification mark 60 with respect to the element body 20 can be enhanced more than the visibility of one of the first portion 61 and the second portion 62 of the identification mark 60 with respect to the element body 20.

As described above, according to the first embodiment, it is possible to achieve both adhesion and visibility of the identification mark 60 to the element body 20.

Note that in the first embodiment, the visibility of the first portion 61 is lower than the visibility of the second portion 62. Specifically, the first portion 61 (the outer edge portion of the identification mark 60) looks blurred compared to the second portion 62 (the portion inside the outer edge portion of the identification mark 60).

According to the first embodiment, the ratio of the material other than the main material of the identification mark 60 included in the first portion 61 is higher than the ratio of the material other than the main material of the identification mark 60 included in the second portion 62. That is, the first portion 61 can contain a material (for example, the same material as the material of the element body 20) having high adhesion to the element body 20 more than the second portion 62 as a material other than the main material of the identification mark. As a result, adhesion to the element body 20 can be enhanced in the first portion 61 of the identification mark 60.

According to the first embodiment, the main material of the identification mark 60 is different from the main material of the element body 20. Therefore, as the ratio of the main material of the identification mark 60 included in the identification mark 60 is higher, the visibility of the identification mark 60 with respect to the element body 20 is improved. Here, according to this configuration, the ratio of the main material of the identification mark 60 included in the second portion 62 is higher than the ratio of the main material of the identification mark 60 included in the first portion 61. Accordingly, in the second portion 62 of the identification mark 60, the visibility with respect to the element body 20 can be enhanced.

In a case where the outer edge portion of the identification mark 60 viewed from the orthogonal direction 100 is peeled off from the element body 20, the peeling is more likely to spread than a case where an inside of the outer edge portion of the identification mark 60 viewed from the orthogonal direction 100 is peeled off from the element body 20. This is because in a case where the inside of the outer edge portion of the identification mark 60 viewed from the orthogonal direction 100 is peeled off with respect to the element body 20, the spread of the peeling is suppressed by the outer edge portion of the identification mark 60 viewed from the orthogonal direction 100. Therefore, it is particularly required to prevent occurrence of peeling at the outer edge portion of the identification mark 60. According to the first embodiment, the adhesion of the first portion 61, which is the outer edge portion of the identification mark 60 viewed from the orthogonal direction 100, to the element body 20 is high. Therefore, the possibility of peeling of the outer edge portion of the identification mark 60 from the element body 20 can be reduced.

According to the first embodiment, the first portion 61 is shorter than the second portion 62 in the orthogonal direction 100. In other words, a thickness of the first portion 61 is thinner than a thickness of the second portion 62. Therefore, a structure such as the penetration portion 61A is more easily formed in the first portion 61 than in the second portion 62. As a result, the adhesion of the first portion 61 to the element body 20 can be made higher than the adhesion of the second portion 62 to the element body 20 by a so-called anchor effect.

According to the first embodiment, the another material of the identification mark 60 fills the penetration portion 61A of the first portion 61. In a case where the another material of the first portion 61 is a material having high adhesion to the element body 20, the another material in close contact with the element body 20 penetrates the first portion 61 through the penetration portion 61A. Thereby, the adhesion of the first portion 61 to the element body 20 can be enhanced.

According to the first embodiment, since the another material of the identification mark 60 and the main material of the element body 20 are the same material, adhesion between them is high. Therefore, the adhesion of the identification mark 60 to the element body 20 can be enhanced.

In a case where the identification mark 60 is made of a conductive material, parasitic capacitance may occur between the identification mark 60 and another electrode or the like formed on the element body 20, for example, the internal electrode 40. Furthermore, there is a possibility that the identification mark 60 and the another electrode or the like formed on the element body 20, for example, the external electrode 50 are short-circuited. According to the first embodiment, since the main material of the identification mark 60 is non-conductive, the occurrence of the parasitic capacitance and the short circuit described above can be prevented.

According to the first embodiment, since the identification mark 60 is exposed to the outside of the element body 20, the visibility of the identification mark 60 can be enhanced.

<Method of Manufacturing Electronic Component According to First Embodiment>

Figure 5:
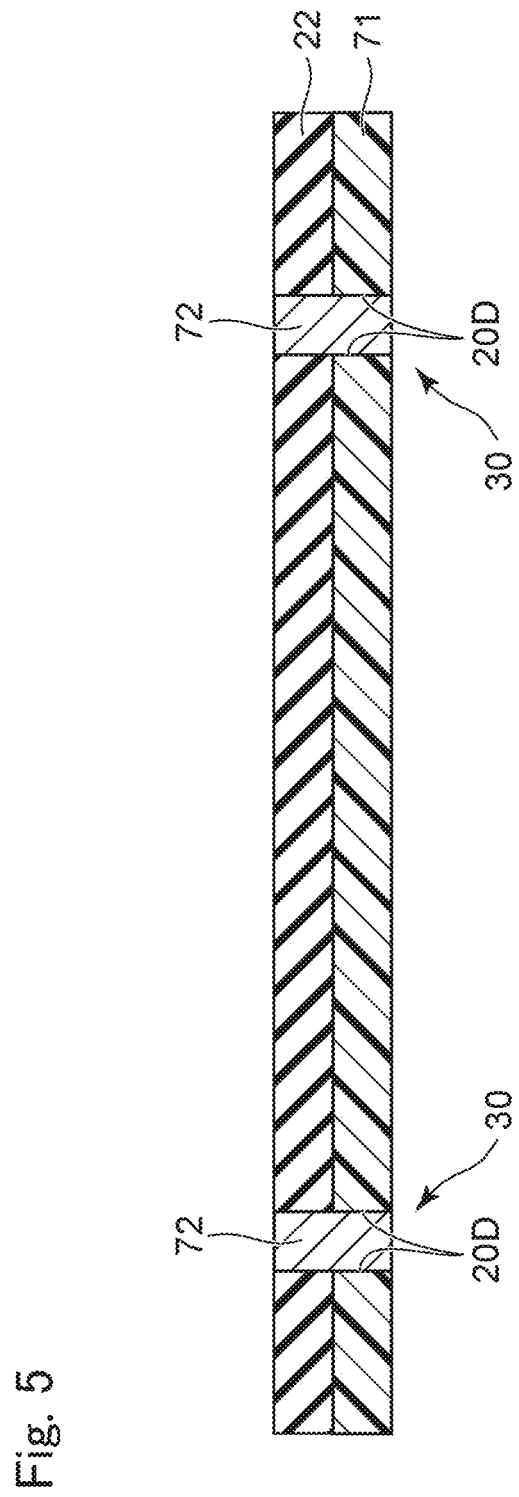
FIG. 5 is a cross-sectional view when an interlayer connection conductor is formed on a base material in a method of manufacturing the electronic component according to the first embodiment of the present disclosure.
Figure 6:
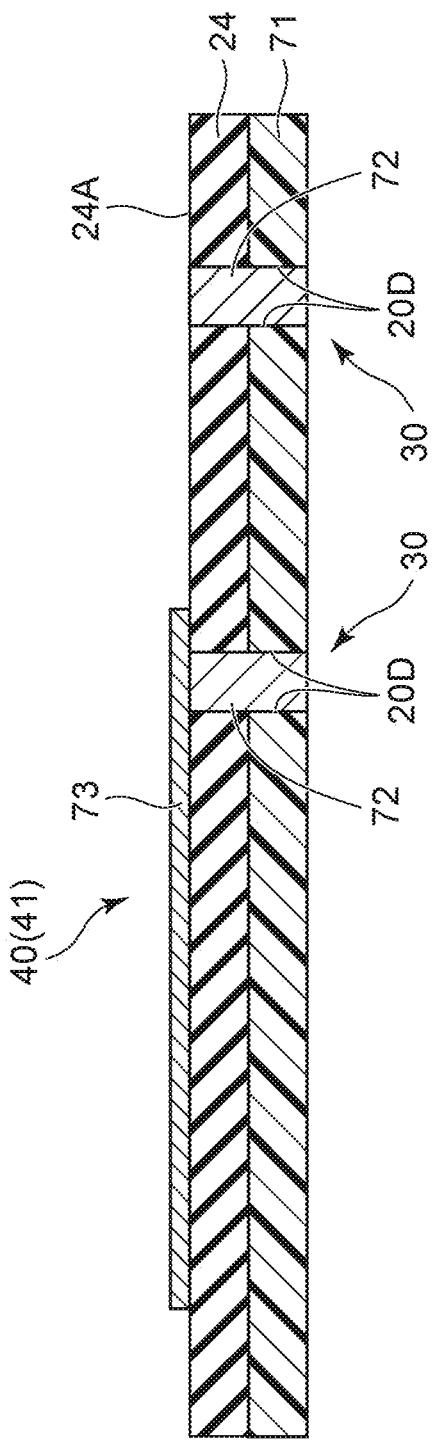
FIG. 6 is a cross-sectional view when an internal electrode is printed on the base material in the method of manufacturing the electronic component according to the first embodiment of the present disclosure.
Figure 7:
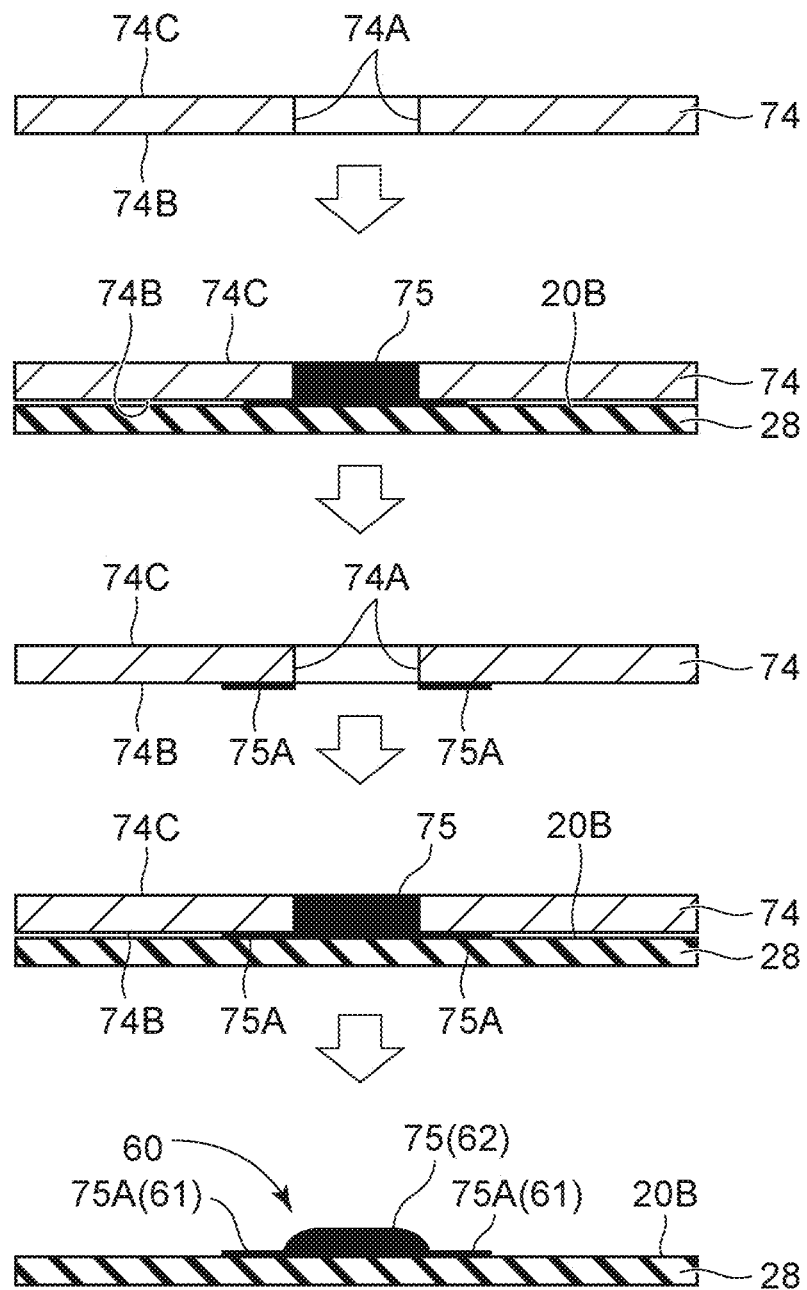
FIG. 7 is a cross-sectional view illustrating a process in which a mark is printed on the base material in the method of manufacturing the electronic component according to the first embodiment of the present disclosure.
Figure 8:
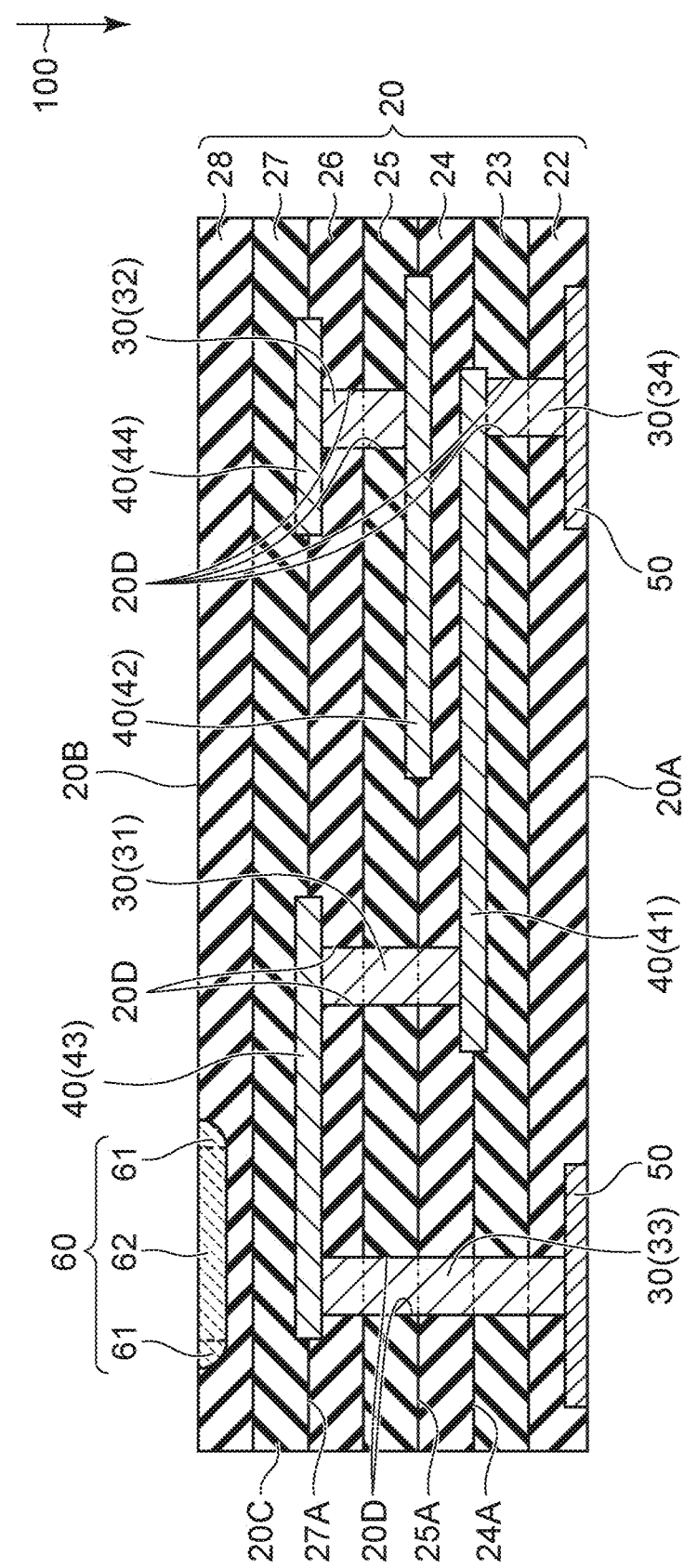
FIG. 8 is a cross-sectional view when a plurality of the base materials are laminated to form an element body in the method of manufacturing the electronic component according to the first embodiment of the present disclosure.

Hereinafter, a method of manufacturing the electronic component 10 according to the first embodiment will be described with reference to FIGS. 5 to 8. FIG. 5 is a cross-sectional view when an interlayer connection conductor is formed on a base material in a method of manufacturing the electronic component according to the first embodiment of the present disclosure. FIG. 6 is a cross-sectional view when an internal electrode is printed on the base material in the method of manufacturing the electronic component according to the first embodiment of the present disclosure. FIG. 7 is a cross-sectional view illustrating a process in which an identification mark is printed on the base material in the method of manufacturing the electronic component according to the first embodiment of the present disclosure. FIG. 8 is a cross-sectional view when a plurality of the base materials are laminated to form an element body in the method of manufacturing the electronic component according to the first embodiment of the present disclosure.

The electronic component 10 is manufactured by segmenting a laminate into a plurality of the element bodies 20. The laminate is formed by integrating the plurality of element bodies 20 in an arranged state. In FIGS. 5 to 8, for convenience of description, only a portion corresponding to one element body 20 of the laminated body is illustrated. A method of manufacturing the electronic component 10 according to the first embodiment includes a sheet forming step, an interlayer connection conductor forming step, an electrode forming step, an identification mark forming step, an element body forming step, a segmenting step, a firing step, and a plating layer forming step.

(Sheet Forming Step)

First, the sheet forming step is executed. In the sheet forming step, the base materials 22 to 28 illustrated in FIG. 2 are individually formed. In the base materials 22 to 28 formed in the sheet forming step, raw materials including a main material, a plasticizer, a binder, and the like corresponding to each of the base materials 22 to 28 are mixed to prepare a slurry constituting each of the base materials 22 to 28. Each of the base materials 22 to 28 at this stage is a green sheet composed of a slurry.

For each of the base materials 22 to 28, for example, a sinterable ceramic powder or the like is used as the main material. As the plasticizer, for example, phthalic acid ester, di-n-butyl phthalate, or the like is used. As the binder, for example, an acrylic resin, polyvinyl butyral, or the like is used.

The slurry constituting each of the base materials 22 to 28 is formed into a sheet shape on a carrier film 71 illustrated in FIG. 5 using, for example, a lip coater, a doctor blade, or the like. That is, each of the seven base materials 22 to 28 is formed on each of the seven carrier films 71. As the carrier film 71, for example, a polyethylene terephthalate (PET) film or the like is used. A thickness of each of the base materials 22 to 28 is, for example, 5 to 100 (μm).

In FIG. 5, the carrier film 71 and the base material 22 formed on the carrier film 71 are illustrated.

Next, the through hole 20D extending through each of the base materials 22 to 28 and the carrier film 71 in the thickness direction is formed.

Note that in FIG. 5, two through holes 20D are formed in the base material 22 and the carrier film 71, but the number of through holes 20D formed in each of the base materials 22 to 28 is not limited to two. Furthermore, the number of through holes 20D formed in each of the seven base materials 22 to 28 and each of the carrier films 71 may be the same or different. Furthermore, furthermore, the number of through holes 20D formed in each of the seven base materials 22 to 28 and each of the carrier films 71 may be the same position or different positions.

In the method of manufacturing the electronic component 10 according to the present embodiment, the number and positions of the through holes 20D formed in each of the seven base materials 22 to 28 and each of the carrier films 71 are determined so that the element body 20 as illustrated in FIG. 2 is finally formed.

(Interlayer Connection Conductor Forming Step)

Next, the interlayer connection conductor forming step is executed. In the interlayer connection conductor forming step, a conductive paste 72 is filled in the through hole 20D formed in each of the base materials 22 to 28 and each of the carrier film 71 in the sheet forming step (see FIG. 5).

The paste 72 is prepared, for example, by mixing raw materials containing a conductive powder, a plasticizer, and a binder.

(Electrode Forming Step)

Next, the electrode forming step is executed. In the electrode forming step, the external electrode 50 and the internal electrode 40 are formed.

In the method of manufacturing the electronic component 10 according to the first embodiment, for example, as illustrated in FIG. 6, a paste 73 corresponding to the internal electrode 41 is formed on the principal surface 24A of the base material 24. The paste 73 is formed by, for example, screen printing, inkjet printing, gravure printing, or the like. Note that the internal electrodes 42 to 44 and the external electrodes 50 are also formed on each of the base materials 22, 25, and 27 in the same manner as the internal electrode 41.

Similarly to the paste 72 described above, the paste 73 is prepared by mainly mixing raw materials containing a conductive powder, a plasticizer, and a binder. Note that the paste 73 may be made of the same raw material as the paste 72, or may be made of a raw material different from the paste 72.

(Identification Mark Forming Step)

Next, the identification mark forming step is executed. The identification mark forming step includes a first printing step and a second printing step.

A method of manufacturing the electronic component 10 according to a first embodiment includes: a first printing step of superimposing a screen plate on a principal surface of a base material, applying a paste to a second surface of the screen plate opposite to a first surface facing the principal surface of the base material, causing the applied paste to pass through an opening formed in the screen plate to be printed on the principal surface of the base material, and causing a part of the paste that has passed through the opening to adhere to a periphery of the opening on the first surface of the screen plate; and a second printing step of superimposing the screen plate used in the first printing step on the base material, applying a paste to the second surface of the screen plate, causing the applied paste to pass through the opening formed in the screen plate to be printed on the principal surface of the base material, and causing the paste adhered to the periphery of the opening on the first surface of the screen plate to be printed on the principal surface of the base material.

Hereinafter, the identification mark forming step will be described with reference to FIG. 7. In FIG. 7, the identification mark forming process is illustrated in five stages. The uppermost side of the paper surface of FIG. 7 is a first stage, and the lowermost side of the paper surface of FIG. 7 is a fifth stage.

As the first stage, a screen plate 74 is prepared. The screen plate 74 includes an opening 74A. The opening 74A is formed at a position corresponding to the second portion 62 of the identification mark 60 in the same shape and size as the second portion 62 of the identification mark 60.

The screen plate 74 and screen plates 76 and 77 described later are not particularly limited as long as they are screen plates used in the field of the screen printing method. For example, a generally used metal mesh or resin fiber mesh partially masked with an emulsion can be used as a screen plate.

As the second stage, the screen plate 74 is overlapped on the principal surface 20B of the base material 28. The screen plate 74 is overlapped such that a principal surface 74B faces the principal surface 20B of the base material 28. The principal surface 74B is an example of the first surface. Next, a paste 75 is applied to a principal surface 74C of the screen plate 74. The principal surface 74C is a surface opposite to the principal surface 74B. The principal surface 74C is an example of the second surface. The paste 75 is made of a material constituting the identification mark 60 described above. In this step, the paste 75 is made of an oxide-added ceramic as a main material and LTCC as another material. Note that a viscosity of the paste 75 in this step is preferably set to be lower than a viscosity of a paste in normal printing of an identification mark (a conventional identification mark without the first portion 61). In this step, the viscosity of the paste 75 is set to 80 to 150 (Pa·s).

As a result, the paste 75 passes through the opening 74A and is printed on the principal surface 20B of the base material 28. At this time, as illustrated in the third stage, a part of the paste 75 (paste 75A) that has passed through the opening 74A adheres to a periphery of the opening 74A on the principal surface 74B of the screen plate 74.

The first to third stages correspond to the first printing step of the identification mark forming step.

Next, as the fourth stage, similarly to the second stage, the screen plate 74 is overlapped on the principal surface 20B of the base material 28. At this time, the screen plate 74 of the third stage is used as it is. That is, the screen plate 74 to which the paste 75A is attached is used. Next, in the same manner as in the second stage, the paste 75 is applied to the principal surface 74C of the screen plate 74.

As a result, as illustrated in the fifth stage, the applied paste 75 passes through the opening 74A and is printed on the principal surface 20B of the base material 28, and the paste 75A attached to the screen plate 74 is also printed on the principal surface 20B of the base material 28.

The fourth stage and the fifth stage correspond to the second printing step of the identification mark forming step.

The paste 75 that has passed through the opening 74A and printed on the principal surface 20B of the base material 28 corresponds to the second portion 62 of the identification mark 60. The paste 75A corresponds to the first portion 61 of the identification mark 60. That is, in the identification mark formation step, the identification mark 60 including the first portion 61 and the second portion 62 thicker than the first portion 61 is formed. In the method of manufacturing the electronic component 10 according to the first embodiment, a thickness of the first portion 61 is 2 to 3 (μm), and a thickness of the second portion 62 is 10 (μm), but the thicknesses are not limited thereto.

In this step, the paste 75A is printed on the principal surface 20B of the base material 28 such that the thickness of the paste 75A is reduced, whereby a partial region of the paste 75A can be brought into a blurred state. This blurred portion can be the penetration portion 61A described above.

Note that the third stage and the fourth stage may be repeatedly executed a plurality of times. As a result, a thickness of the paste 75A increases, and an area of the paste 75A when viewed from the direction orthogonal to the principal surface 20B of the base material 28 increases. The thickness and area of the paste 75A do not increase endlessly, but are saturated when the third stage and the fourth stage are repeated a certain number of times. A saturation amounts of the thickness and area of the paste 75A are determined by an amount of the paste 75A to be applied, a viscosity of the paste 75A, a size of the opening 74A, and the like.

(Element Body Forming Step)

Next, the element body forming step is executed. In the element body forming step, as illustrated in FIG. 8, the base materials 22 to 28 excluding the carrier film 71 are laminated and pressure-bonded in a mold. As a result, the element body 20 is obtained.

In the element body forming step, the seven base materials 22 to 28 are laminated in the order from the base material with a small reference numeral to the base material with a large reference numeral, specifically, in the order of the base materials 22, 23, 24, 25, 26, 27, and 28. As a result, the principal surface 20A of the base material 22 and the principal surface 20B of the base material 28 become outer surfaces of the element body 20.

In the element body forming step, each of the base materials 22 to 28 is pressure-bonded, whereby the external electrode 50 enters the base material 22, and the identification mark 60 enters the base material 28.

(Segmentation Step)

Next, a segmentation step is performed. In the segmentation step, the laminate in which the plurality of element bodies 20 are arranged is cut into the plurality of element bodies 20. For cutting the laminate, for example, a dicing saw, a guillotine cutter, a laser, or the like is used. After the laminate is cut, the corner portion and the edge portion of the element body 20 may be polished by, for example, barrel processing or the like. Note that the polishing may be executed after the firing step.

(Firing Step)

Next, the firing step is executed. In the firing step, the element body 20 is fired. As a result, each of the base materials 22 to 28 constituting the element body 20 is cured. That is, each of the base materials 22 to 28, which is a flexible green sheet, is cured and changed into a substrate.

(Plating Layer Forming Step)

Next, the plating layer forming step is executed. In the plating layer forming step, the external electrode 50 is subjected to a known plating treatment. As a result, as illustrated in FIG. 2, the plating layer 55 is formed so as to completely cover the external electrode 50.

Note that the plating layer 55 may be formed so as to cover only a part of the external electrode 50. Furthermore, in addition to the external electrode 50, the plating layer 55 may be formed so as to cover the principal surface 20A around the external electrode 50.

According to this manufacturing method, the paste 75A remaining on the screen plate 74 in the first printing step can be used as the first portion 61 (thin portion) of the identification mark 60 in the second printing step. Furthermore, the paste 75 printed on the principal surface 20B of the base material 28 (element body 20) through the opening 74A of the screen plate 74 can be used as the second portion 62 (a portion thicker than the first portion 61) of the identification mark 60. As a result, the identification mark 60 including the first portion 61 having high adhesion and the second portion 62 having high visibility can be formed.

<Modification of Method of Manufacturing Electronic Component According to First Embodiment>

In the method of manufacturing an electronic component according to the first embodiment, the identification mark forming step may be a step as described below.

That is, the method of manufacturing the electronic component 10 according to the first embodiment may include: a first printing step of overlapping a first screen plate on a principal surface of a base material, applying a first paste onto the first screen plate, and printing the applied first paste on a first region of the principal surface of the base material; and a second printing step of overlapping a second screen plate on the principal surface of the base material, applying a second paste having the same main material as the first paste and a lower ratio of the main material than the first paste onto the second screen plate, and printing the applied second paste on a second region in contact with the first region on the principal surface of the base material as viewed from a direction orthogonal to the principal surface of the base material.

Figure 9:
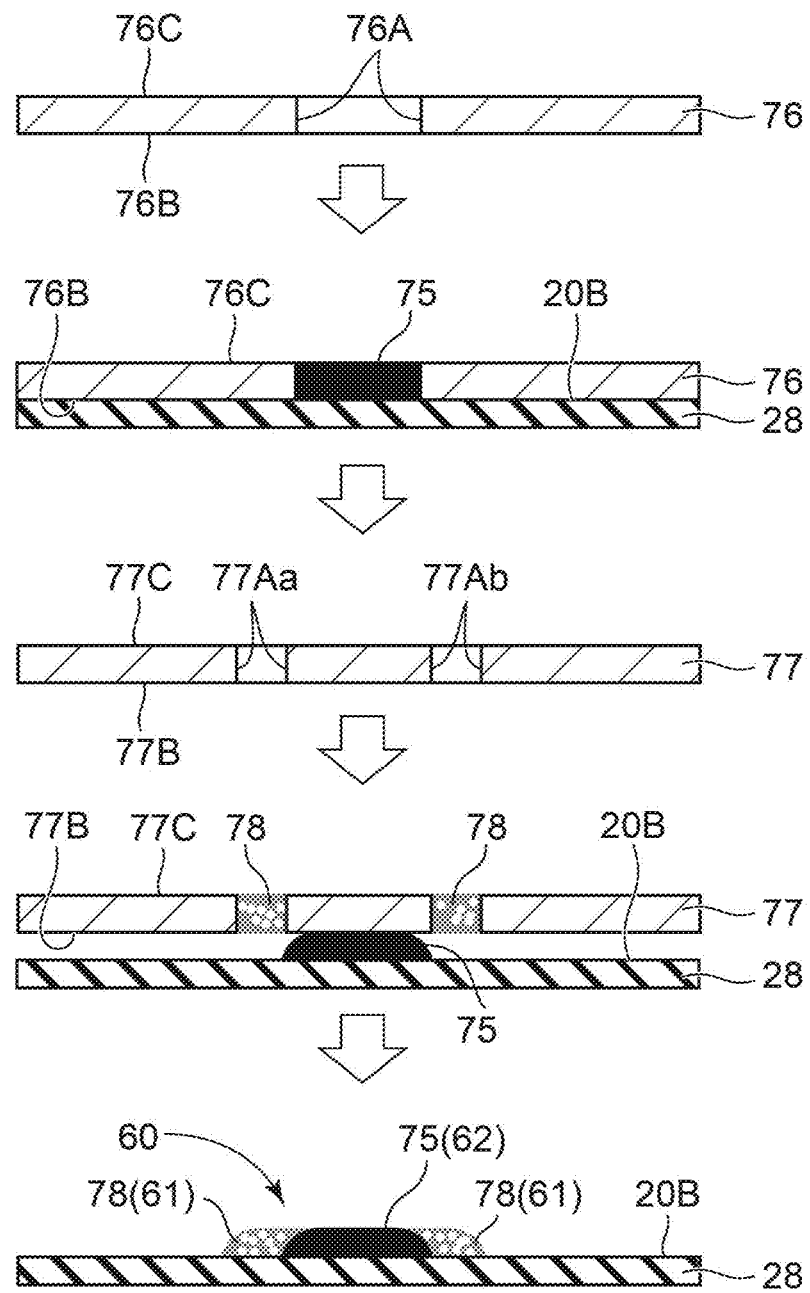
FIG. 9 is a cross-sectional view illustrating a process in which a mark is printed on a base material in a modification of the method of manufacturing the electronic component according to the first embodiment of the present disclosure.

Hereinafter, a modification of the identification mark forming process will be described with reference to FIG. 9. FIG. 9 is a cross-sectional view illustrating a process in which an identification mark is printed on a base material in a modification of the method of manufacturing the electronic component according to the first embodiment of the present disclosure. In FIG. 9, the identification mark forming process is illustrated in five stages. The uppermost side of the paper surface of FIG. 9 is a first stage, and the lowermost side of the paper surface of FIG. 9 is a fifth stage.

As the first stage, a screen plate 76 is prepared. The screen plate 76 is an example of the first screen plate. The screen plate 76 includes an opening 76A. The opening 76A is formed at a position corresponding to the second portion 62 of the identification mark 60 in the same shape and size as the second portion 62 of the identification mark 60.

As the second stage, the screen plate 76 is overlapped on the principal surface 20B of the base material 28. The screen plate 76 is overlapped such that a principal surface 76B faces the principal surface 20B of the base material 28. Next, the paste 75 is applied to a principal surface 76C of the screen plate 76. The paste 75 is an example of the first paste. The principal surface 76C is a surface opposite to the principal surface 76B. As a result, the paste 75 passes through the opening 76A and is printed on the principal surface 20B of the base material 28. A region of the principal surface 20B of the base material 28 on which the paste 75 is printed in the second stage is the first region.

The first stage and the second stage described above correspond to the first printing step of the identification mark forming step.

As the third stage, a screen plate 77 is prepared. The screen plate 77 is an example of the second screen plate. The screen plate 77 includes openings 77Aa and 77Ab. The openings 77Aa and 77Ab are formed at positions corresponding to the first portion 61 of the identification mark 60 in the same shape and the same size as the first portion 61 of the identification mark 60.

As the fourth step, the screen plate 77 is overlapped on the principal surface 20B of the base material 28. The screen plate 77 is overlapped such that a principal surface 77B faces the principal surface 20B of the base material 28. At this time, the openings 77Aa and 77Ab are adjacent to a first region of the principal surface 20B of the base material 28. In this step, the openings 77Aa and 77Ab surround the first region of the principal surface 20B of the base material 28 as viewed in a thickness direction of the base material 28. Next, a paste 78 is applied to a principal surface 77C of the screen plate 76. The principal surface 77C is a surface opposite to the principal surface 77B. As a result, as illustrated in the fifth stage, the paste 78 passes through the openings 77Aa and 77Ab, and is printed on the principal surface 20B of the base material 28. A region of the principal surface 20B of the base material 28 on which the paste 78 is printed in the fourth stage is the second region. The second region is in contact with the first region.

A main material and another material of the paste 78 are the same as the main material and the another material of the paste 75. That is, in this step, the paste 78 is made of an oxide-added ceramic and LTCC. Note that the main material and the another material of the paste 78 may be different from the main material and the another material of the paste 75.

A ratio of the main material (oxide-added ceramic) of the paste 78 is lower than a ratio of the main material (oxide-added ceramic) of the paste 75. In other words, a ratio of the another material (LTCC) of the paste 78 is higher than a ratio of the another material (LTCC) of the paste 75. The paste 78 is an example of the second paste. Note that in FIG. 9, the another material of the paste 78 is schematically illustrated by small circles.

The third to fifth stages correspond to the second printing step of the identification mark forming step.

In the present manufacturing method, the paste 75 that has passed through the opening 76A and been printed on the principal surface 20B of the base material 28 corresponds to the second portion 62 of the identification mark 60. The paste 78 that has passed through the openings 77Aa and 77Ab and been printed on the principal surface 20B of the base material 28 corresponds to the first portion 61 of the identification mark 60. Note that the first to fourth stages may be repeatedly executed a plurality of times. Furthermore, the third stage and the fourth stage may be performed before the first stage and the second stage.

According to this manufacturing method, the second portion 62 (portion having a high ratio of the main material) of the identification mark 60 can be formed on the principal surface 20B of the base material 28 (element body 20) in the first printing step. Furthermore, in the second printing step, the first portion 61 (portion having a lower ratio of the main material than the second portion 62) of the identification mark 60 can be formed on the principal surface 20B of the base material 28 (element body 20). As a result, the identification mark 60 including the first portion 61 having high adhesion and the second portion 62 having high visibility can be formed.

Second Embodiment

Figure 10:
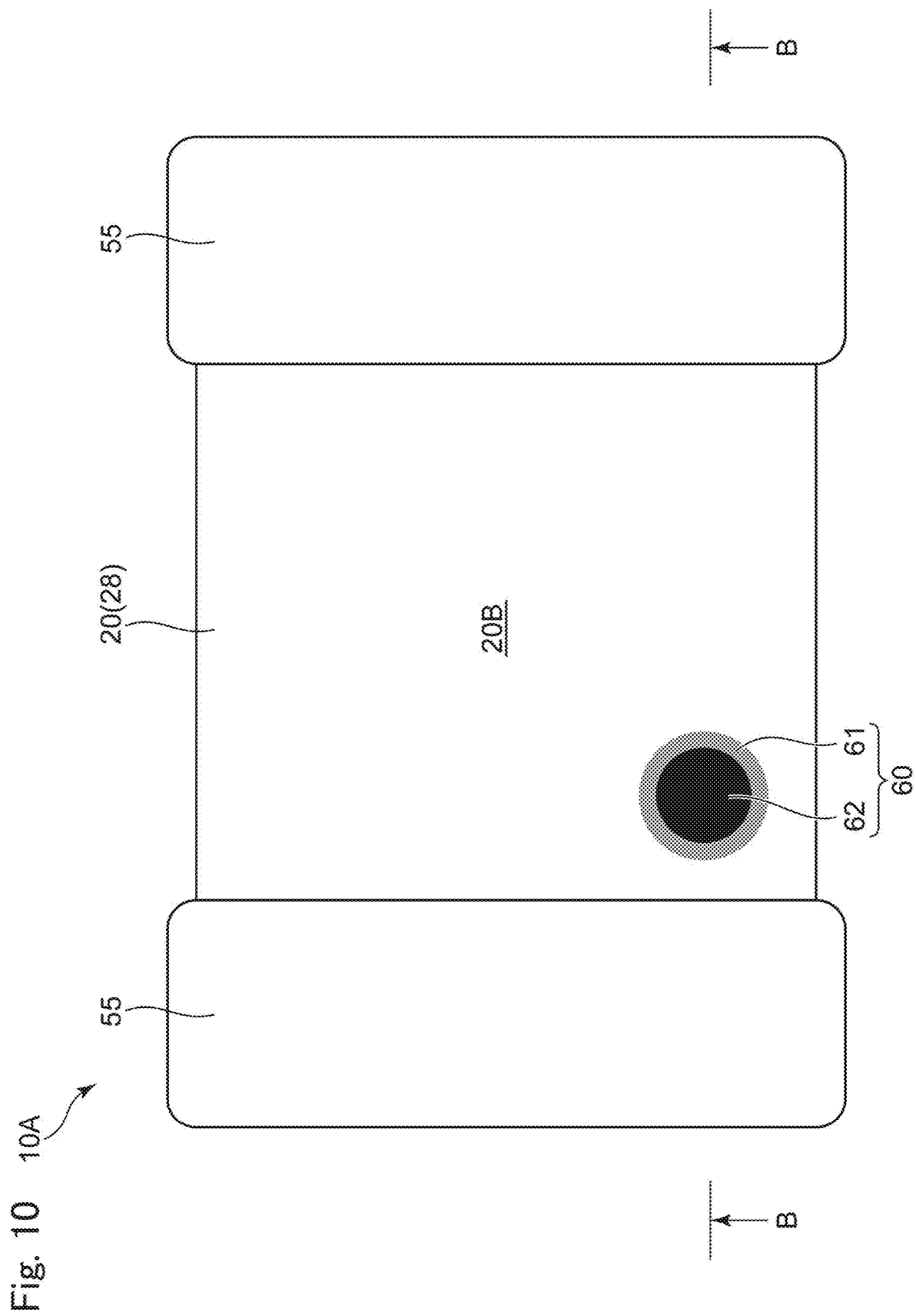
FIG. 10 is a plan view of an electronic component according to a second embodiment of the present disclosure.

FIG. 10 is a plan view of an electronic component according to a second embodiment of the present disclosure. FIG. 11 is a cross-sectional view illustrating a B-B cross section of FIG. 10. An electronic component 10A according to the second embodiment is different from the electronic component 10 according to the first embodiment in that a side electrode 92 is formed on the side surface 20C of the element body 20. Hereinafter, differences from the first embodiment will be described. Common points with the electronic component 10 according to the first embodiment are denoted by the same reference signs, and the description thereof will be omitted in principle and described as necessary.

As illustrated in FIGS. 10 and 11, the electronic component 10A according to the second embodiment includes an element body 20, an interlayer connection conductor 30, an internal electrode 40, and a plating layer 55. Furthermore, the electronic component 10A includes an extraction electrode 80, a base electrode 91, and a side electrode 92. Note that, although the electronic component 10A according to the second embodiment does not include the external electrode 50, the electronic component 10A may include the external electrode 50.

The element body 20, the interlayer connection conductor 30, and the internal electrode 40 are configured in the same manner as the electronic component 10 according to the first embodiment.

As illustrated in FIG. 11, the extraction electrode 80 is formed on a principal surface located inside the element body 20 among principal surfaces of the plurality of base materials 22 to 28. In the second embodiment, the extraction electrode 80 is formed on the principal surface 25A of the base material 25.

The extraction electrode 80 is configured similarly to the internal electrode 40. That is, the extraction electrode 80 is obtained by printing a conductive paste on the principal surface of the base material (the principal surface 25A in the second embodiment) and co-firing the paste with the base material. However, unlike the internal electrode 40, the extraction electrode 80 is exposed to the outside of the element body 20. In the second embodiment, the extraction electrode 80 is exposed to the side surface 20C of the element body 20.

The base electrode 91 is formed outside the element body 20 (on the principal surfaces 20A and 20B in the second embodiment). The base electrode 91 is configured similarly to the internal electrode 40 and the extraction electrode 80. That is, in the second embodiment, the base electrode 91 is obtained by printing a conductive paste on the principal surfaces 20A and 20B of the element body 20 and co-firing the paste with the base material.

The side electrode 92 is formed from the base electrode 91 formed on the principal surface 20A of the element body 20 to the base electrode 91 formed on the principal surface 20B of the element body 20 via the side surface 20C. That is, the side electrode 92 is formed on the principal surfaces 20A and 20B and the side surface 20C of the element body 20. The side electrode 92 is applied to the base electrode 91 and the side surface 20C by a known means such as a dip method. As a result, the side electrode 92 is in contact with the extraction electrode 80 formed on the side surface 20C, and is electrically connected to the extraction electrode 80. Note that in the second embodiment, the side electrode 92 covers the entire base electrode 91, but the side electrode 92 may cover only a part of the base electrode 91.

The plating layer 55 covers the side electrode 92. Note that in the second embodiment, the plating layer 55 covers the entire side electrode 92, but the plating layer 55 may cover only a part of the side electrode 92.

The identification mark 60 is configured similarly to the electronic component 10 according to the first embodiment. That is, the identification mark 60 is also applicable to the electronic component 10A in which the side electrode 92 is formed on the side surface 20C of the element body 20.

Third Embodiment

FIG. 12 is a cross-sectional view of an electronic component according to a third embodiment of the present disclosure, which corresponds to the A-A cross section of FIG. 1. An electronic component 10B according to the third embodiment is different from the electronic component 10 according to the first embodiment in that the identification mark 60 is formed inside the element body 20. Hereinafter, differences from the first embodiment will be described. Common points with the electronic component 10 according to the first embodiment are denoted by the same reference signs, and the description thereof will be omitted in principle and described as necessary.

As illustrated in FIG. 12, the element body 20 of the electronic component 10B according to the third embodiment includes a base material 29 in addition to the base materials 22 to 28, and the base materials 22 to 29 are integrated. The base material 29 is configured similarly to the base materials 22 to 28. Similarly to the base materials 22 to 28, the interlayer connection conductor 30, the internal electrode 40, and the external electrode 50 can be formed on the base material 29.

The base material 29 is laminated on the base material 28. Thus, the principal surface 20B of the element body 20 of the electronic component 10B is a principal surface of the base material 29. The base material 28 is sandwiched between the base materials 27 and 29. As a result, the principal surface 28A of the base material 28 does not face the outside of the element body 20 and is located inside the element body 20.

The identification mark 60 is formed on the principal surface 28A of the base material 28. That is, the identification mark 60 is formed inside the element body 20. Note that the identification mark 60 may be formed on the principal surfaces of other base materials 22 to 27, for example, the principal surface 27A of the base material 27.

Note that in the third embodiment, since the identification mark 60 is formed inside the element body 20, the identification mark 60 cannot be directly visually recognized. However, when light is applied to the base material 29, the identification mark 60 can be recognized due to a difference in reflection between a region where the identification mark 60 is formed and a region where the identification mark 60 is not formed.

According to the third embodiment, the identification mark 60 is formed inside the element body 20. Therefore, the identification mark 60 is sandwiched between the base materials 28 and 29. As a result, the adhesion of the identification mark 60 to the element body 20 can be enhanced.

Note that, by appropriately combining arbitrary embodiments among the various embodiments described above, the effects of the respective embodiments can be achieved. For example, the identification mark 60 may be formed both outside and inside the element body 20 by combining the first embodiment and the third embodiment.

Although the present disclosure has been fully described in connection with the preferred embodiment thereof with reference to the drawings as appropriate, it is to be noted that various changes and modifications are apparent to those skilled in the art. Such changes and modifications are to be understood as included within the scope of the present disclosure as defined by the appended claims unless they depart therefrom.

10 electronic component
20 element body
60 identification mark
61 first portion
61A penetration portion
62 second portion
100 orthogonal direction

What is claimed is:

1. An electronic component comprising:
   an element body; and
   a mark provided on the element body, wherein
   the mark comprises:
      a first portion constituting a part of the mark when viewed from an orthogonal direction orthogonal to the mark; and
      a second portion located at a position different from the first portion and connected to the first portion when viewed from the orthogonal direction,
   a ratio of a main material of the mark comprised in the first portion is lower than a ratio of the main material of the mark comprised in the second portion, and wherein
   a length of the first portion in the orthogonal direction is shorter than a length of the second portion in the orthogonal direction.

2. The electronic component of claim 1, wherein
   the main material of the mark is different from a material of the element body.

3. The electronic component of claim 1, wherein
   when viewed from the orthogonal direction, the first portion is an outer edge portion of the mark, and the second portion is a portion inside the outer edge portion of the mark.

4. The electronic component of claim 1, wherein
   the mark comprises another material different from the main material, and wherein
   the first portion comprises a penetration portion penetrating from one end to another end in the orthogonal direction and filled with another material of the mark.

5. The electronic component of claim 1, wherein
   the mark comprises another material different from the main material, and wherein
   the main material of the mark is a same material as the element body.

6. The electronic component of claim 1, wherein
   the main material of the mark is non-conductive.

7. The electronic component of claim 1, wherein
   the mark is provided on an outer surface of the element body.

8. The electronic component of claim 1, wherein
   the mark is provided inside the element body.

9. The electronic component of claim 1, wherein
   the element body comprises ceramic.

10. The electronic component of claim 2, wherein
when viewed from the orthogonal direction, the first portion is an outer edge portion of the mark, and the second portion is a portion inside the outer edge portion of the mark.

11. The electronic component of claim 2, wherein
the mark comprises another material different from the main material, and wherein
the first portion comprises a penetration portion penetrating from one end to another end in the orthogonal direction and filled with another material of the mark.

12. The electronic component of claim 3, wherein
the mark comprises another material different from the main material, and wherein
the first portion comprises a penetration portion penetrating from one end to another end in the orthogonal direction and filled with another material of the mark.

13. The electronic component of claim 3, wherein
the mark comprises another material different from the main material, and wherein
the main material of the mark is a same material as the element body.

14. The electronic component of claim 4, wherein
the mark comprises another material different from the main material, and wherein
the main material of the mark is a same material as the element body.

* * * * *